United States Patent
Polczynski

(10) Patent No.: US 8,806,960 B2
(45) Date of Patent: Aug. 19, 2014

(54) FLOW MEASURING DEVICE INCLUDING SEGMENTED PIPE SECTION WITH A LINER PROVIDED IN THE INNER SURFACE

(75) Inventor: Andrew Polczynski, North Huntingdon, PA (US)

(73) Assignee: Andrew Polczynski, North Huntingdon, PA (US)

( * ) Notice: Subject to any disclaimer, the term of this patent is extended or adjusted under 35 U.S.C. 154(b) by 383 days.

(21) Appl. No.: 13/179,506

(22) Filed: Jul. 9, 2011

(65) Prior Publication Data

US 2013/0008260 A1   Jan. 10, 2013

(51) Int. Cl.
*G01F 1/28* (2006.01)

(52) U.S. Cl.
USPC ............................................................ 73/861.71

(58) Field of Classification Search
None
See application file for complete search history.

(56) References Cited

U.S. PATENT DOCUMENTS 3,638,487 A * 2/1972 Raskin ................. 73/861.71
7,059,176 B2 * 6/2006 Sparks .................. 73/54.41

* cited by examiner

*Primary Examiner* — Harshad R Patel

(57) ABSTRACT

The present invention involves an improvement in the measurement of sewage discharge through the measurement of mass flow rate and conversion to volumetric flow rate using a flow measuring device connected to a segment of pipe through which the sewage flows.

3 Claims, 1 Drawing Sheet

Section A - A

Section A - A

FLOW MEASURING DEVICE INCLUDING SEGMENTED PIPE SECTION WITH A LINER PROVIDED IN THE INNER SURFACE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

The invention relates generally to a device for measuring fluid flow, and more specifically, to electronically measuring flow through a fluid pipe by mass flow rate and converting the data to a volumetric flow rate. The invention is particularly useful for measuring sewage flow in sewage systems.

2. Background of the Invention

Most residential utilities can be directly metered thus allowing the provider to charge a fee based on the resident's usage of those utilities. Direct measurement of residential sewage discharge has been difficult to accomplish. Direct metering of fluid flow in a pipe is typically done in a conduit that is completely full of a homogeneous fluid of relatively constant density.

Mechanical means are often used within the pipe when measuring fluids that are not very viscous. The flow of viscous or hazardous fluids is often measured by introducing an acoustic signal through the fluid. These methods cannot be used with sewage because it is most often conveyed by gravity through a pipe that is partially full. Further, sewage is a mixture of liquid and solid material of different compositions and densities making acoustic measurement difficult and inaccurate. Systems exist for measuring larger flows of sewage that have become more liquefied such as those found in main collection pipes, but are prohibitively expensive for use on individual building pipes.

Municipal sewage flow is typically represented by volume. Many sewage utilities charge their customers according to the volume of fresh water used as measured by the volume of potable water flowing into a building through a volumetric flow meter. This indirect measurement can prove difficult to justify, especially when customers use large quantities for activities such as irrigation, car washing, and filling swimming pools. These types of activities utilize large quantities of fresh water which will not flow into the municipal sewer system. Further, this method cannot be used when a public potable water supply is unavailable.

Because of the difficulty in correlating water usage to sewage discharge, many utilities charge a flat rate for sewer service. This practice is often deemed unacceptable by residents as well. Large families usually contribute a greater volume of sewage to the municipal system than individuals who live alone; however, in a flat rate system they pay the same amount as a large family.

Direct measurement of sewage flow rates in municipal collection systems is typically conducted by the system owner for the purposes of analyzing system performance. The techniques used to accomplish these efforts are generally far too expensive to utilize for the purposes of daily metering to determine individual usage. The few devices that have been developed to measure sewage flow by volume have not gained widespread acceptance. These devices collect sewage in a hopper which tips when a predicted volume of sewage is obtained. Each time the hopper tips, one unit is counted. The potential for the solid materials to adhere to the side or bottom of the hopper and providing ineffective operation or false readings are a likely cause of concern for collection system operators.

A more practical means of measuring sewage flow by mass rather than volume is needed. By assuming the sewage flow to be mostly water, the mass flow rate can be converted to a volumetric flow rate.

BRIEF SUMMARY OF THE INVENTION

In accordance with the invention, the measurement of a combination of liquid and solid substances flowing through piping systems is enhanced by utilizing a device capable of measuring fluid flow on a mass basis. An advantage of mass flow measurement of such a combination of liquid and solid substances such as in the case of sewage is that it can be accomplished on a scale that is practical for use on an individual residence basis. An additional advantage of this invention is that it contains no moving parts that require regular maintenance. For example, in the hopper-type of flow measuring device the tipping hopper is continually in motion and frequently requires maintenance.

BRIEF DESCRIPTION OF THE DRAWINGS

The invention, together with the above and other objects and advantages will be best understood from the following detailed description of the preferred embodiment of the invention shown in the accompanying drawings. The drawings depict an example of a potential configuration of the system and are comprised of three figures.

Figure 1:
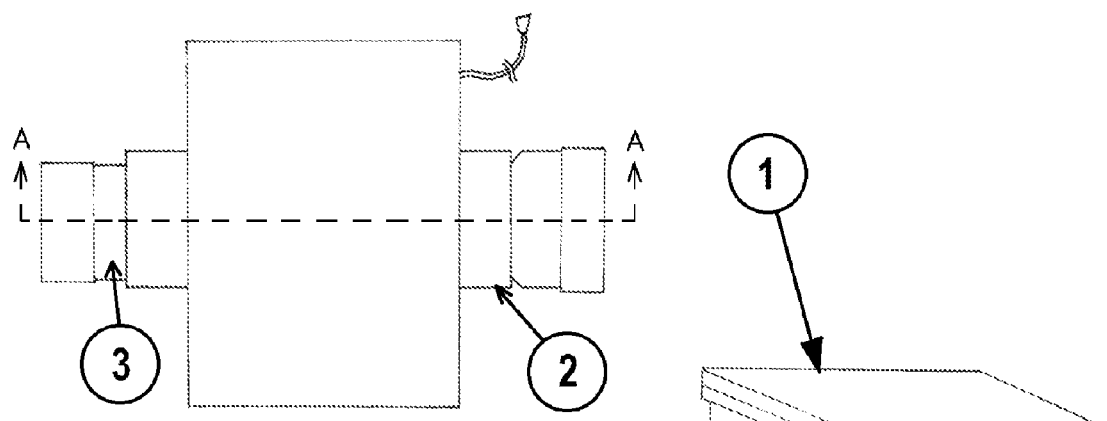
FIG. 1 is a plan view of the preferred embodiment of the invention.
Figure 2:
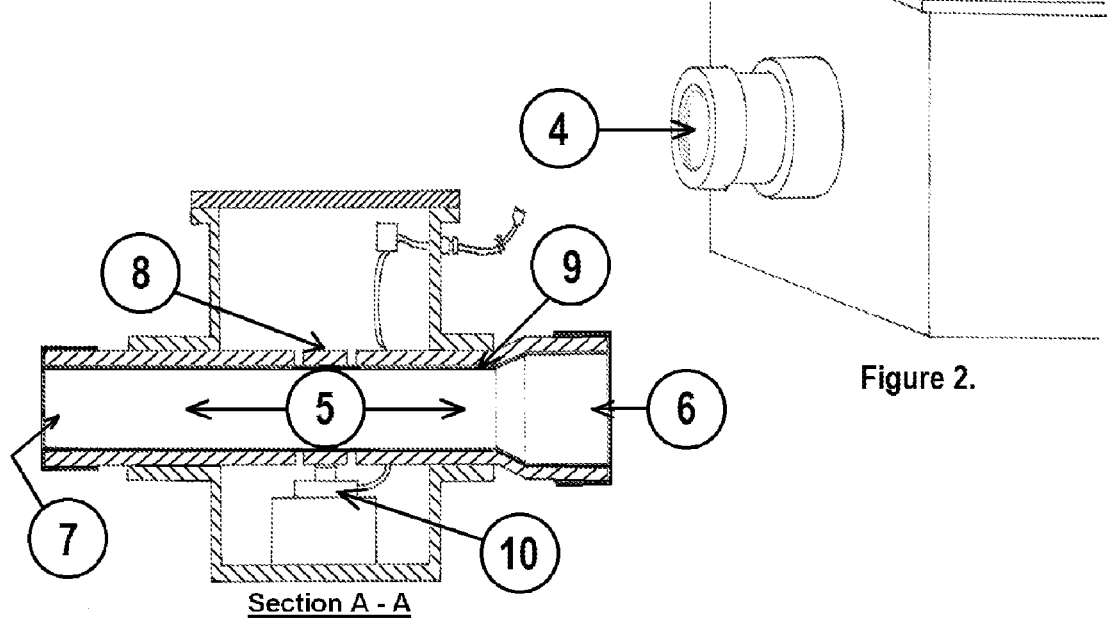
FIG. 2 is a three dimensional view of the invention.
Figure 3:
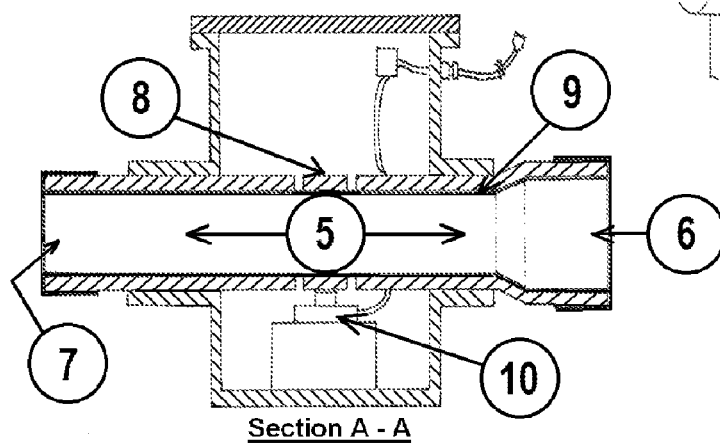
FIG. 3 is a section of an elevation view of the invention.

The flow measuring device is comprised of a housing (1) which in the preferred embodiment is a hollow block form with a circular cylindrical socket (2) extending through it. A pipe (3) is inserted into the socket, said pipe (3) defining a principal flow duct (4) extending through the housing in one longitudinal direction (5).

The principal flow duct (4) has an inlet (6) at one end and an outlet (7) at the other end. The pipe (3) contains a segmented section (8) circumferentially detached from the pipe (3). The segmented section (8) abuts the pipe longitudinally, but is allowed to move independently from the rest of the pipe in the axial direction.

Inserted into the pipe (3) and the segmented section (8) is a flexible sleeve-like liner (9) having an external geometry that is complimentary to the pipe (3) and segmented section (8) and extending through the entire length of the pipe (3).

A mass ascertaining means (10) is situated within the housing (1) and connected to the segmented section (8) to detect the movement of the segmented section (8).

DETAILED DESCRIPTION OF THE INVENTION

The detailed embodiments of the invention are set forth below. The example is provided by way of explanation of the invention, not as a limitation of the invention. The inventor has recognized that direct volumetric flow measurement of residential sewage has not been successfully implemented. The invention details the fact that, contrary to the current state of the art, direct measurement of mass flow can be practically accomplished for individual buildings.

In the preferred embodiment of the invention, the main body of the device consists of a section of plastic pipe three feet long that is of the same diameter as the existing or proposed pipe that requires fluid flow measurement. Most of the pipe section is contained within a cubical plastic housing which is sized to allow a few inches of the pipe section to protrude through its walls on two sides. These protrusions provide a means to connect the device to the existing or proposed pipe that requires fluid flow measurement.

Within the housing, a small length of the plastic pipe is cut from the center of the plastic pipe, for instance, a two inch long piece thereby creating a two inch segment in the middle of the plastic pipe in line with but detached from the rest of the pipe.

A thin sleeve of flexible polymer, such as nitrile rubber, is inserted through the small section of pipe. This sleeve acts as a liner to prevent sewage from exiting the pipe through the joints between the detached segment of the plastic pipe and the rest of the plastic pipe on either side of the small detached segment.

An electronic force sensor or load cell is then placed beneath the small segment of pipe and supports the weight of that small segment. Alternately, a tension type force sensor may be installed above the pipe and the weight of the pipe is suspended from the sensor.

The force sensor is connected to an electronic signal converter which records the output readings of the force sensor. The signal converter is programmed with an algorithm which utilizes time and a constant conversion factor to convert the weight recorded within the small pipe segment into a volumetric flow rate.

Having thereby described the subject matter of the present invention it should be apparent that many substitutions, modifications and variations of the invention are possible in light of the above teachings. It is therefore to be understood that the invention as taught and described herein is only to be limited to the extent of the breadth, and scope of the appended claim.

What is claimed is:

1. A flow measurement device for measuring fluid flow in a fluid source, said flow measurement device comprising:
    a housing defining a cylindrical inlet and cylindrical outlet;
    a pipe for transmitting fluid situated within said housing, with said pipe having a segmented section of the pipe circumferentially detached from the pipe so that said segmented section has an inlet and an outlet and can move independently from the rest of the pipe with the pipe and segmented section in contact with each other longitudinally and both the pipe and the segmented section each having an inner surface and an outer surface;
    a liner, having an inner surface and an outer surface, inserted into the pipe and the segmented section so that the outer surface of the liner is in contact with the inner surface of the pipe and the segmented section so that the outer surface of the liner is in contact with the inner surface of the pipe and the inner surface of the segmented section of pipe;
    a flow indicating means located within the housing and connected to the outside surface of the segmented section of pipe therein enabling the flow ascertaining means to detect motion in the segmented section;
    an electronic signal recorder located within the housing and electrically connected to said flow ascertaining means and configured to record the output of the flow ascertaining means; and
    a signal converter electrically connected to the electronic signal recorder and configured to convert the output of the electronic signal recorder into a volumetric flow rate therein capturing the flow of fluid passing through the segmented section of the pipe.

2. A flow measuring device for measuring fluid flow in a fluid source as in claim 1, wherein said flow ascertaining means is an electronic force sensor.

3. A flow measurement device for measuring fluid flow in a fluid source as in claim 1, wherein said flow measuring device is a tension type force sensor.

* * * * *